(12) United States Patent
Sapci

(10) Patent No.: US 10,432,784 B2
(45) Date of Patent: Oct. 1, 2019

(54) SYSTEM AND METHOD FOR EFFECTUATING REAL-TIME SHAPED DATA TRANSFER DURING CALL SETUP PROCEDURE IN A TELECOMMUNICATION NETWORK

(71) Applicant: Mehmet Hakan Sapci, Istanbul (TR)

(72) Inventor: Mehmet Hakan Sapci, Istanbul (TR)

( * ) Notice: Subject to any disclaimer, the term of this patent is extended or adjusted under 35 U.S.C. 154(b) by 0 days.

(21) Appl. No.: 16/006,519

(22) Filed: Jun. 12, 2018

(65) Prior Publication Data

US 2018/0295232 A1 Oct. 11, 2018

Related U.S. Application Data

(63) Continuation of application No. PCT/TR2016/050324, filed on Sep. 1, 2016.

(30) Foreign Application Priority Data

Dec. 14, 2015 (TR) .............................. a 2015/16024

(51) Int. Cl.
   *H04M 3/42* (2006.01)
   *H04M 3/54* (2006.01)
   *H04M 1/725* (2006.01)
   *H04M 19/02* (2006.01)

(52) U.S. Cl.
   CPC ... *H04M 3/42017* (2013.01); *H04M 1/72547* (2013.01); *H04M 3/42093* (2013.01); *H04M 3/42374* (2013.01); *H04M 3/543* (2013.01); *H04M 3/42051* (2013.01);

(Continued)

(58) Field of Classification Search
   None
   See application file for complete search history.

(56) References Cited

U.S. PATENT DOCUMENTS

| 4,811,382 A | 3/1989 | Sleevi |
| 5,321,740 A | 6/1994 | Gregorek et al. |
| 6,385,308 B1 | 5/2002 | Cohen et al. |

(Continued)

FOREIGN PATENT DOCUMENTS

| EP | 0 593 556 B1 | 8/1999 |
| EP | 1 890 472 A1 | 2/2008 |

(Continued)

OTHER PUBLICATIONS

International Search Report and Written Opinion of the International Searching Authority, dated Dec. 15, 2016, pp. 1-10, issued in International Patent Application No. PCT/TR2016/050324, European Patent Office, Rijswijk, The Netherlands.

International Preliminary Report on Patentability, dated Mar. 2, 2018, pp. 1-20, issued in International Patent Application No. PCT/TR2016/050324, European Patent Office, Rijswijk, The Netherlands.

*Primary Examiner* — Antim G Shah
(74) *Attorney, Agent, or Firm* — Brinks Gilson & Lione

(57) ABSTRACT

The present disclosure generally relates to the field of telecommunication systems. The disclosure more particularly relates to a system and method for effectuating real time shaped data transfer during call setup procedure in a telecommunication network, where selection is made to shape the data transfer during call setup by called party, providing a dynamic tone service operation, where dynamic tone consists of dynamic ring back tone and dynamic busy tone.

17 Claims, 3 Drawing Sheets

(52) U.S. Cl.
CPC .... *H04M 19/02* (2013.01); *H04M 2203/2011* (2013.01); *H04M 2207/12* (2013.01); *H04M 2207/18* (2013.01)

(56) References Cited

U.S. PATENT DOCUMENTS

| | | |
|---|---|---|
| 7,006,608 B2 | 2/2006 | Seelig et al. |
| 7,227,929 B2 | 6/2007 | Seelig et al. |
| 8,054,960 B1 | 11/2011 | Gunasekara |
| 8,428,239 B2 | 4/2013 | Mutya et al. |
| 8,880,035 B1 | 11/2014 | Beck et al. |
| 8,953,769 B2 | 2/2015 | Jacobson |
| 2005/0105706 A1 | 5/2005 | Kokkinen |
| 2007/0294425 A1* | 12/2007 | Sobti ............... H04M 3/02 709/231 |
| 2008/0108334 A1* | 5/2008 | Wang ............... H04M 3/42017 455/414.1 |
| 2014/0118465 A1* | 5/2014 | Scott ............... H04M 1/72519 348/14.03 |

FOREIGN PATENT DOCUMENTS

| | | |
|---|---|---|
| KR | 10-0471121 B1 | 3/2005 |
| WO | WO 00/49793 | 8/2000 |
| WO | WO 2008/036008 A1 | 3/2008 |

* cited by examiner

SYSTEM AND METHOD FOR EFFECTUATING REAL-TIME SHAPED DATA TRANSFER DURING CALL SETUP PROCEDURE IN A TELECOMMUNICATION NETWORK

RELATED APPLICATIONS

The present patent document is a continuation of PCT Application Serial No. PCT/TR2016/050324, filed Sep. 1, 2016, designating the United States and published in English, which claims priority to TR 2015/16024, filed Dec. 14, 2015, each of which are hereby entirely incorporated by reference.

BACKGROUND

1. Technical Field

The present invention generally relates to the field of telecommunication systems. The invention more particularly relates to a system and method for effectuating real time shaped data transfer during call setup procedure in a telecommunication network, providing a dynamic tone service operation, where dynamic tone is defined as dynamically determined ring back tone or dynamic busy tone.

2. Background Information

Unlike text based communications, both the calling party and the called party need to be available at the same time for a voice call to successfully take place. There are systems available to provide feedback to the calling party while call setup procedure progress until called party answers. These include ring back tone to indicate that the phone of the called party is ringing and busy tone to indicate that the device of the called party or telecom network is occupied. For mobile phones, busy tone is also used for cases where phone of the called party rings and called party rejects the call after that. Ring back tone in Europe is 425 Hz and has a pattern of 2 seconds of tone followed by 4 seconds of silence typically. Busy tone in Europe is also 425 Hz and has a pattern of 0.5 seconds of tone followed by 0.5 seconds of silence typically.

SUMMARY

Ability to reject an incoming call has been provided to the market with mobile phones. However, while called device busy and telecom network busy status do not require an explanation, intentional rejection of an incoming call requires more messaging capability, since it requires an explanation or a planning message or similar. It is believed that current intentional rejection functionality do not meet needs of telecom users. This lack of functionality cause called parties to use silence button instead of reject button. Using silence button, called party leaves the caller to wait more and seems as if they do not hear the phone. This usage, that is using silence button and leaving the phone to ring is popular, however, is still uncomfortable and inefficient for both parties.

Services for personalizing the ring back tone by a tone, music, voice messages and/or other multimedia messages are available in the state of the art, under the name ring back tone (RBT). This service has been available since the 2000s and has a wide user base. If the called party is a subscriber to an RBT service, they can determine an RBT that will be played to the calling party. A subscriber may make use of multiple RBTs. An RBT may be assigned to all incoming numbers, a group of numbers or a single number or it can be assigned for a specific time of day. It is also possible to select an RBT which gives information to calling parties such as "I'm in a meeting" or "I'm driving". However, this can only be arranged beforehand and cannot be dynamically selected during call setup.

Smartphones also offer the option to send an SMS while rejecting the call. When a call is received in a smartphone, the called party can accept the call, reject it or send an SMS to the calling party and reject the call simultaneously. For the latter option, the SMS can be selected from a prearranged list and include options such as "I am driving".

In reference to prior art applications in general, it is not possible to convey specific information to the calling subscriber during call setup phase in a real time shaped manner, where real time shaping include real time generation of the whole content such as by using text to speech feature, or formation of content by adding existing components such as adding a dynamic tone to preset tone. Here dynamic tone refers to dynamic ring back tone and dynamic busy tone, preset tone refers to ring back tone and busy tone determined before the call setup. Dynamically shaping the ring back tone or busy tone by the called subscriber would allow the caller to be notified of a certain situation that explains why the call is not taken or when the called party plans to call back or similar.

One of the available prior art documents in the field of the present disclosure can be referred to as U.S. Pat. No. 5,321,740 disclosing a system in which the call is received by a computerized switchboard located in a second local switchboard after the call is initiated. A connected network determines if the line is in a busy or available state by using a network switching system (ANSS). Depending on the busy or available state of the line, instead of playing the standard tones, it plays the pre-defined records. If the line is available, one or more pre-recorded records are played to the calling party, the records are played until an answer is received. If the line is busy, pre-recorded records continue to be played in a pre-defined interval of time. While the records are being played, the system continues to check the state of the line. The ring back tone or busy tone is not dynamically definable by the called subscriber.

Another prior art document in the field of the present disclosure can be referred to as U.S. Pat. No. 7,227,929 B2 disclosing a telecommunication system that provides a voice message during the time interval between initiation of the dialing phase and answering the phone by the called subscriber. The pre-defined record cannot be dynamically specified by the called subscriber.

U.S. Pat. No. 8,953,769 B2 discloses a system enabling a calling party to control ring back tones overriding called party selected ring back tones in a wireless or wireline network, such as a voice over IP (VoIP) network or time division multiplexed (TDM) network.

U.S. Pat. No. 6,385,308 discloses a telephone system that facilitates personalized announcements during phone preanswering time or call setup phase. Personalized announcements can be played to the calling subscriber. The announcements are played until the line is busy or the call is answered. It is to be noted that the played tones cannot be defined by the called subscriber; a dynamic selection cannot be made. Additionally, a different tone cannot be played when the line is busy.

U.S. Pat. No. 8,428,239 B2 discloses a system for playing a local ringback tone. The system pertains to determining whether to play a pre-stored local ringback tone instead of the network ringback tone and playing determined ringback tone. The method allows for switching between the network and determined ringback tones before call connection or call release based on calling party input. Input may be entered via a hot key in a keypad or via a user interface.

US 2005/105706 A1 discloses a system for providing pre-connection messaging and output. The system allows a called party subscribing to a service to select an audio, visual or audio/visual output or message, where selection is made by the called party while setting up the service, and send selected output or message to a calling party while a communication link is being established between the two parties via an intelligent network. The output may be in the form or a personalized ringback tone. The user may assign a personalized ringback tone to one person or a group of people based on their preferences.

Patents exemplifying the state of the art therefore include but are not limited to U.S. Pat. Nos. 5,321,740, 7,227,929, KR 20040079460, U.S. Pat. Nos. 8,953,769, 6,385,308, EP 0 593 556 B1, KR 10-0471121 B1, U.S. Pat. Nos. 8,054,960 B1, 4,811,382, 7,006,608, KR19990005344, U.S. Pat. No. 8,428,239 B2, US 2005/105706 and U.S. Pat. No. 8,880,035 B1. However, prior art applications services require the user to determine their desired RBT in advance and do not allow the user the freedom to dynamically customize the RBT as they see fit while they are receiving incoming calls.

Therefore, the present system and method is devised under the recognition that there is a need in the state of the art for a dynamic tone where the called subscriber can dynamically shape the busy tone or ring back tone during call setup. Here call setup is defined as the time interval between the initiation of the dialing by caller till voice connection between the caller and called party or disconnection of caller. It is to be noted that disconnection of the called party does not define end of call setup, as long as the caller is connected, since data transfer continues thanks to dynamic tone system. Data transfer to caller requires preserving the voice connection to the caller during call setup, and obtaining called subscriber's shaping input through called subscriber's device by methods suitable to call setup, which provides ability to shape the tone played, or other media to be sent to caller. Meanwhile, since the caller hears a tone just after dialing, before any input of the called party, a tone should be available at that moment, but be changed later at suitable moments.

The present system and method aims to improve on the applications described in the prior art. The system and method provides a ring back tone system (an RBT system) that in addition to allowing a subscribed called party to assign preset RBTs, also allows the subscriber to change and/or add to their chosen tone while receiving incoming calls from a calling party quickly and efficiently. The system and method allows the subscriber to supplement their RBT and busy tone with tones, music, text, pictures, videos and/or other media to relay information to the calling party while call setup is taking place. The system and method makes use of SIM applications, USSD applications, smartphone applications, wearable device applications and smart car applications as selection platform.

The present system and method provides a dynamic tone feature as provided by the characterizing features described herein.

One of the aspects of the present system and method is to provide a system and method by which specific information is conveyed to a calling subscriber by a called subscriber during call setup phase.

Another aspect of the present system and method is to provide a system and method by which real-time shaped information is conveyed to a calling subscriber by a called subscriber during call setup phase in a dynamic manner.

Yet another aspect of the present system and method is to provide a system and method by which the ring back tone is dynamically changeable and selectable by the called subscriber during call setup phase.

Further an aspect of the present system and method is to provide a system and method by which the busy tone is dynamically changeable and selectable by the called subscriber among the busy-tone-specific options during call setup phase.

Still further an aspect of the present system and method is to provide a system and method by which communication of information during call setup phase is enabled and enriched.

Still further an aspect of the present system and method is to provide a system and method by which information can be instantaneously shaped and conveyed before the calling subscriber ends initiated call.

Still further an aspect of the present system and method is to provide a system and method to enrich call setup communication, which can be defined as communication during the time interval between dialing of caller till voice connection between caller and called party is established or disconnection of caller. It is to be noted that call setup communication can be enriched by dynamically changing the ring back tone alone during the call setup phase or by additional information that can be relayed to the calling party using dynamic busy tone.

Still further an aspect of the present system and method is to provide a system and method by which busy tones and ring back tones are instantaneously dynamically changeable by the called subscriber. In accordance with this object, the present system and method enables the called subscriber to make a selection during call setup phase and to dynamically change the playing records. On the other hand, the called party can dynamically create additional, i.e. non-predefined verbal or textual content to be communicated to the calling party on a real-time basis.

Still further an aspect of the present system and method is to provide a system and method by which selection or input capabilities of the called subscriber's phone are used during call setup phase, in order to convey information from called party to caller party. In accordance with this object, for the case of dynamic busy tone function, the present system and method uses the call forwarding capabilities of the telecommunication network in order to trigger the dynamic busy tone function, because the capabilities of the called phone is generally restricted to answering the call when there is an incoming call, whereas all capabilities of the phone can be used after rejecting the call, and because connection to caller is preserved with call forwarding. Methods to implement call forwarding may be to use call forwarding function or use more sophisticated Intelligent Network solutions.

Still further an aspect of the present system and method is to provide a system and method by which the called subscriber is able to make a selection for dynamic busy and ring back tone functions while the phone is ringing. In accordance with this object, the selection of the user is received over exceptional selection platforms which enable user input while the phone is ringing, such as push notification alert of a smartphone applications or similar applications, or enhanced calling applications.

Still further an aspect of the present system and method is to provide a system and method which enables listing of rejected calls in rejected/missed calls list of the called phone when dynamic busy tone and dynamic busy and ring back tone functions are used. In accordance with this object, the present system and method uses the call forwarding capability of the telecommunication network in order to trigger the dynamic busy tone function. In line with this solution, the subscriber pushes the standard call rejection button on the terminal to reject a call, thus the rejected call is redirected by the call forwarding on subscriber busy service and the dynamic busy tone function is performed. Since standard call rejection button is used to reject the call, the call is seen in the rejected calls list. On the other hand, in the dynamic busy and ring back tone service, one of the dynamic busy tone options is selectable to reject the call. When one of the dynamic busy tone options is selected, the line to the called subscriber is disconnected and thus the call is listed under the rejected/missed calls list of the phone, which is a merged list on most phones. In order to disconnect the line, call leg management abilities of mobile network can be used, while solutions are not limited to that.

Still further an aspect of the present system and method is to provide a system and method by which the called subscriber can input his answering selection in an easy and fast manner. In accordance with this object, the present system and method makes use of USSD applications, SIM applications and easily accessible and fast responding smartphone applications, smart watch applications or other wearable device applications, smart car applications or similar applications.

Still further an aspect of the present system and method is to provide a cost sensitive solution that enables use of current network components for performing dynamic busy tone function and that can be easily applicable to the telecom network. In accordance with this object, the present system and method uses the call forwarding on subscriber busy capability of the network in order to trigger the dynamic busy tone function.

Still further an aspect of the present system and method is to provide a system and method usable by wireline and mobile service providers where a mobile network user is called. A wireline user can also use the service with advanced telecommunication devices, i.e. devices having a screen and supporting applications.

Still further an aspect of the present system and method is to provide a system and method usable on different telecommunication devices such as earlier generation mobile terminals, smartphones, smart watches, other wearable devices, smart cars and similar.

Still further an aspect of the present system and method is to provide a system and method by which dynamic busy tone and dynamic busy and ring back tone functions are performable for a second call received while making a call, on devices where call waiting option is activated.

Still further an aspect of the present system and method is to provide a system and method by which a dynamically selected picture, video, animated gif or similar media can be sent to the calling subscriber, thus providing equally effective solutions compared to dynamic tone playing.

The present disclosure generally relates to enhanced dynamic busy tone and enhanced dynamic busy and ring back tone functions as will be explained in the detailed description.

The present disclosure relates to a communication system that is operational to differentiate whether the line is busy or available and to dynamic record playing systems in the form of dynamic busy tone and dynamic busy and ring back tone functions and selection platforms such as SIM applications, USSD applications, smartphone applications, smart watch or other wearable device applications, smart car applications and similar. The present system and method enables playing of a real time shaped busy tone to the calling subscriber when the line of the called subscriber is busy or when the subscriber rejects a voice call or playing of a real time shaped ring back tone while the phone of the called subscriber is ringing. The real time shaping of busy tone or ring back tone may be done by using existing components, such as preset tone as part 1 and dynamic tone as part 2, or by generating the whole tone from scratch, by using technologies like text to speech and similar.

The system and method enables the called subscriber to make a practical and fast selection during the process of establishing a voice call, where he/she receives the call. The system and method exceptionally enables the called subscriber to make a selection even while the phone is ringing. A preset busy tone can continue with a dynamic busy tone or preset ring back tone can continue with a dynamic ring back tone thanks to this selection operation during call setup. To this end, the calling subscriber is able to receive information during the call setup phase. A call being rejected is listed under missed/rejected call list.

Basic aspects of the dynamic busy tone and dynamic busy and ring back tone functions are provided below in the form of process steps.

Dynamic busy tone function process steps:
Subscriber A calls subscriber B,
Telecom network plays standard ring back tone or ring back tone (RBT) to subscriber A,
Subscriber B rejects the call or the line is busy,
The service starts playing preset busy tone to subscriber A,
The service shows dynamic busy tone options on the device screen of subscriber B,
Subscriber B selects the dynamic busy tone to be played from that moment on,
The service starts playing the selected dynamic busy tone,
Telecom network hangs up the line if maximum time defined for the telecom network is reached or if subscriber A hangs up,
The service checks if the selected dynamic busy tone is played as long as the length of the message. If the tone is not played until the end, respective dynamic busy tone message such as "I'll call you back in 10 minutes" is sent to subscriber A as a text message or through smartphone application interface.

Dynamic busy and ring back tone service process steps;
Subscriber A calls subscriber B,
The service plays standard ring back tone or preset ring back tone to subscriber A,
The service shows dynamic busy and dynamic ring back tone options to subscriber B,
Subscriber B selects the dynamic busy tone or dynamic ring back tone to be played from that moment on,
If subscriber B selects one of the dynamic ring back tone options, the service starts playing selected dynamic ring back tone. The service again shows the options list also indicating the currently playing dynamic ring back tone and waits for a selection from the subscriber. If the subscriber again selects a dynamic ring back tone, this step is repeated. If subscriber B accepts the call, call setup phase is terminated. If the maximum time defined for the telecom network is reached or if subscriber A hangs up, telecom network disconnects the line,
If subscriber B selects one of the dynamic busy tone options, the service starts playing the selected dynamic busy tone and disconnects the line to subscriber B. The call is listed under missed/rejected calls in subscriber B's phone which is a merged list. Subscriber A's telephone line remains connected to dynamic busy and ring back tone service. If maximum time defined for the telecom network is reached or if subscriber A hangs up, telecom network hangs up the line, The service checks if the selected dynamic busy tone or dynamic ring back tone is played as long as the length of the message. If the tone is not played until the end, respective dynamic busy tone or dynamic ring back tone message is sent to subscriber A as a text message, picture or any other media.

Dynamic tone service can send a picture, video, animated gif or similar media in addition to or alternative to the tone. Below, the process steps of the dynamic tone service are presented when this function of the service is activated by the operator.

Subscriber A calls subscriber B,

Telecom network plays the standard or preset ring back tone to subscriber A,

Subscriber B rejects the call or the line is busy,

The service starts playing the preset busy tone to subscriber A,

On the screen of subscriber B, in addition to dynamic busy tone options, the service shows dynamic picture or dynamic video, animated gif or similar media options, Subscriber B selects the dynamic busy tone, dynamic picture, video, animated gif or similar media to be conveyed to subscriber A after the selection, If dynamic busy tone is selected, the service starts playing the respective tone. If dynamic picture, video, animated gif or similar media is selected, the service continues to play preset busy tone and sends the respective media to subscriber A as an MMS or as a special message such as an imessage or similar, If the maximum time defined for the telecom network is reached or if subscriber A hangs up, telecom network hangs up the line, If dynamic busy tone is selected, the service checks if the dynamic busy tone is played until the completion of the message. If the tone is not played until the completion of the message, the service sends the respective dynamic busy tone message to subscriber A as a text message or any other media such as "I'll call you back in 10 minutes".

BRIEF DESCRIPTION OF THE DRAWINGS

Accompanying drawings are given solely for the purpose of exemplifying a dynamic busy tone or dynamic busy and ring back tone system, whose advantages over prior art were outlined above and will be explained in brief hereinafter.

The drawings are not meant to delimit the scope of protection as identified in the claims nor should they be referred to alone in an effort to interpret the scope identified in said claims without recourse to the technical disclosure herein.

DETAILED DESCRIPTION

Figure 1:
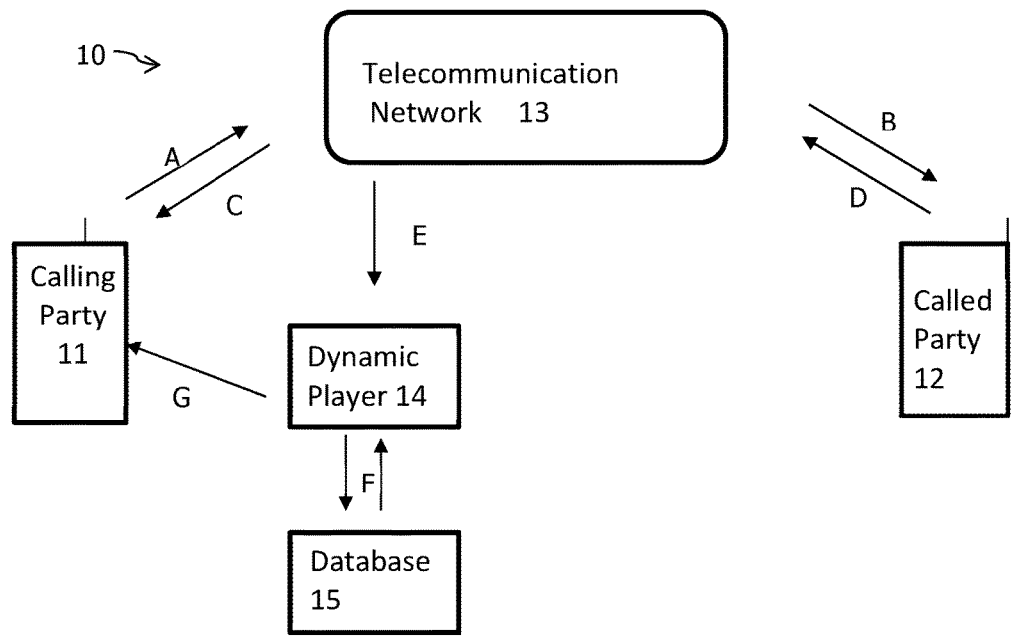
FIG. 1 demonstrates a block diagram of dynamic tone system, or more particularly dynamic busy tone system playing a preset busy tone.

The following numerals are used in the detailed description:
10 Dynamic tone system
11 Calling party
12 Called party
13 Telecommunication network
14 Dynamic player
15 Database
16 Selection platform The present system and method is referred to as a dynamic tone system either enabling dynamic busy tone or dynamic tone system. Dynamic tone system (10) subscribers can be mobile operator subscribers using mobile phones, smartphones, smart watches, other wearable technology devices, smart cars and other telecommunication devices. Although landline phones are not the primary target of dynamic tone system, they can be subscriber to the system when selection platforms like IVR are used or landline phones with screen and input abilities are used. Callers to dynamic tone system include landline phones and all other telecom devices.

An embodiment of the system and method is to have a dynamic busy tone player application (dynamic player 14) which can start playing a new record while a record is already being played and which sends the respective message to the calling subscriber over SMS, imessage or similar if the selected tone cannot be played in its entirety. A tone within the context of the present system and method can be any audio record prepared by a service provider as confirmed by the subscriber. As will be delineated in detail, a tone can also be created directly by the subscriber. A tone can be created by way of inputting a given text by the subscriber and transforming user inputted text into an audio record by conventional text-to-speech conversion methods.

Dynamic tone system (10) allows subscribers to convey additional information (such as "I will call you back in 10 minutes.") besides their unavailability to the calling party (11) when rejecting a call.

Dynamic tone system (10) and more particularly dynamic busy tone system and dynamic busy and ring back tone system makes it possible for the called party to shape their ring back tone or busy tone in real time, as call setup is taking place with tones, music, pictures, videos, animated gifs and/or other media.

Dynamic tone system (10) makes use of call forwarding for dynamic busy tone service. Call Forwarding When Busy service or more sophisticated Intelligent Network solutions are examples of call forwarding methods and are therefore considered within the same technical context according to the system and method. With this setup, when the called party (12) reject the call, the connection to the called party is disconnected and the call is forwarded to the dynamic player (14), while connection to the calling party (11) is still intact, which is critical for the service delivery since the called party (12) has limited use of their phone while phone is ringing. In addition, the call is listed under missed/rejected calls list with this method.

Dynamic tone system (10) allows subscribers to make selections in real time as call setup is taking place. To achieve this, the dynamic player (14) receives selections over selection platforms such as USSD applications, SIM applications, smartphone applications, smart watch applications, other wearable device applications or smart car applications or similar.

Dynamic tone system (10) also allows subscribers to quickly and conveniently make a selection over above mentioned selection platforms. For this purpose, certain codes are specified for USSD and SIM applications to run on basic phones, whose usability is limited. For example, an empty response can indicate "I can't pick up", "1" indicates "I will call back in 10 minutes" and "2" indicates "I will call back in 20 minutes". Similarly, "11" indicates "I will call back in 10 minutes" and "12" indicates "I will call back in 20 minutes" for a secondary content provider.

Dynamic tone system (10) uses call forwarding service provided by operators for convenience and economy. Dynamic tone system (10) allows subscribers to prepare lists of tones, music, pictures, videos, animated gifs and/or other media specific to certain callers, dates and/or times of day. Dynamic tone system (10) can also be used for a second incoming call if call waiting service is activated for the called party (12).

The system and method uses Call Forwarding On Subscriber Busy function or Intelligent Network abilities of telecom network to transfer the call from the called party (12) to the dynamic player (14).

Dynamic tone system (10) also comprises a database (15) that hosts preset ring back tones and busy tones, dynamic ring back tones and busy tones, durations of said tones, text messages to be sent to the calling party (11) if tones are not played to the end, as well as music, picture, video, animated gif and other media that can be sent to the calling party (11) by dynamic tone service and subscriber selections thereof.

Any output (e.g., audio, visual, or audio/visual output) provided to a caller can be selected from a pre-stored list of outputs available via the network. Additionally, or alternatively, information can be uploaded or otherwise provided by a user, either using a communications device (e.g., a mobile telephone, etc.), or another suitable device, such as a computer, or the like.

In one embodiment of the present disclosure, the following sequence of actions takes place according to the dynamic busy tone system.

- A calling party (11) places a call to a called party (12),
- Operator plays ring back tone to the calling party,
- Called party (12) is busy or rejects the call,
- Preset busy tone is presented to the calling party (11),
- Dynamic busy tone service provides the called party with tone, music, or other media options to be sent to the calling party (11) as call setup is taking place,
- The called party (12) selects which dynamic busy tone, music, and/or other media is to be sent to the calling party (11) as call setup is taking place,
- Selected dynamic busy tone, music and/or other media is played to the calling party (11) in real time as call setup is taking place,
- The calling party (11) receives tone, music and/or other media selected by the called party (12) as call setup is taking place,
- The tone, music or other media received by the calling party is played until the maximum duration defined by the operator is reached or the calling party (11) hangs up,
- Dynamic busy tone service monitors whether the tone, music and/or other media was fully transferred to the calling party (11). If not, dynamic busy tone service sends an SMS or imessage or other media consisting of the content of the tone, music and/or other media to the calling party (11),
- In case non audio content, i.e. picture, video or animated gif is selected by the called party (12), dynamic busy tone service sends these content independent of call setup completion, i.e. in that case preset busy tone may continue to play to calling party (11) and video or animated gif can be sent during call setup or after call setup completion.

In another embodiment of the present disclosure, the following sequence of actions takes place according to the dynamic busy and ring back tone system.

- A calling party (11) places a call to a called party (12),
- Operator plays preset ring back tone to the calling party,
- Dynamic busy and ring back tone service provides the called party (12) with dynamic ring back tone or dynamic busy tone options to be presented to the calling party (11) as call setup is taking place, i.e. while the phone of called party (12) is ringing,
- If the called party (12) selects a dynamic ring back tone, selected dynamic ring back tone is presented to the calling party (11) in real time, as call setup is taking place. The called party (12) can select another dynamic ring back tone as call setup is taking place. Operation can be repeated until the called party (12) picks up the call or until the maximum duration defined by telecom network is reached,
- If the called party (12) selects a dynamic busy tone, selected busy tone is presented to the calling party (11) in real time as call setup is taking place. The connection to the called party (12) is disconnected and the call is listed as a rejected/missed call while connection to the calling party (11) is still intact. Dynamic busy tone is played until the maximum duration defined by the telecom network is reached or the calling party (11) hangs up,
- Dynamic busy and ring back tone service monitors whether the tone was fully presented to the calling party (11). If not, dynamic busy and ring back tone service sends an SMS or imessage or other media consisting of the content of the tone to the calling party (11).

FIG. 1 illustrates an example embodiment, referred to as dynamic tone system (10) or more particularly dynamic busy tone system playing preset busy tone. Dynamic tone system (10) comprises calling party (11), called party (12), telecom network (13), dynamic player (14) and database (15). Calling party (11) places a call to called party (12) via telecom network (13) (A).

Telecom network (13) sends a ringing signal to called party (12) (B) and sends a standard ring back tone to calling party (11) (C). Called party (12) rejects the call (D). Telecom network (13) directs the call to dynamic player (14) via call forwarding service (E). Dynamic player (14) obtains preset busy tone of called party (12) from database (15) (F) and plays said preset busy tone to the calling party (11) (G).

Figure 2:
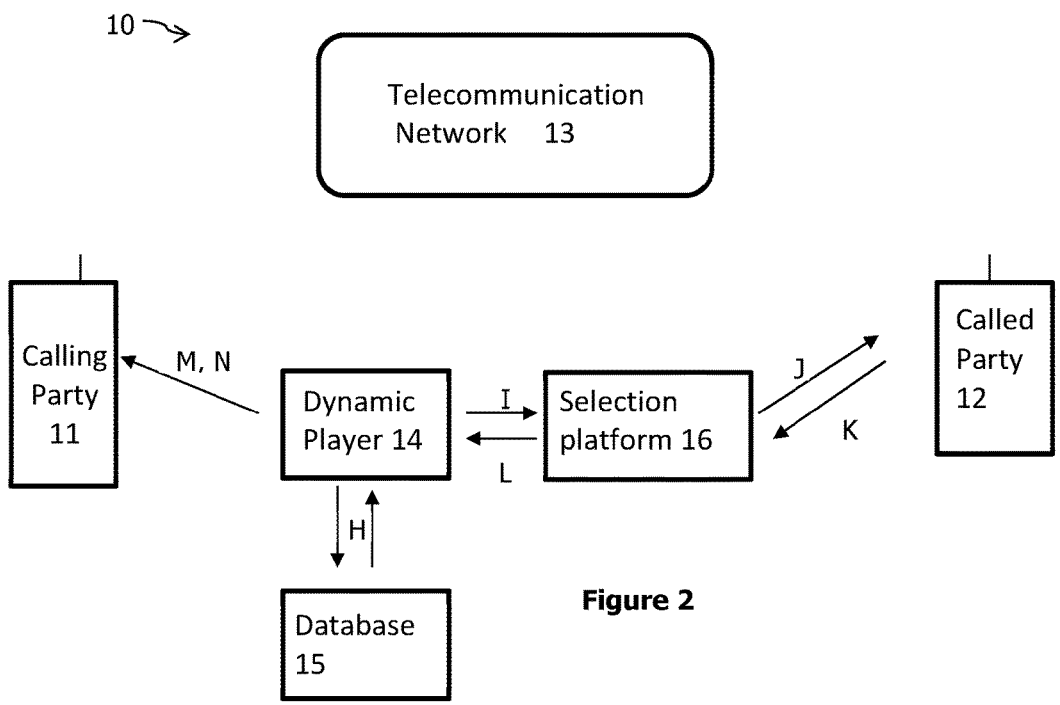
FIG. 2 demonstrates a block diagram of dynamic tone system, or more particularly dynamic busy tone system playing dynamic busy tone.

FIG. 2 illustrates an example variation, referred to as dynamic tone system (10) or more particularly dynamic busy tone system playing dynamic busy tone. Dynamic busy tone system (10) comprises calling party (11), called party (12), telecom network (13), dynamic player (14), database (15) and selection platform (16) such as a smartphone application. Dynamic player (14) obtains a list of choices of tones, music, pictures, videos and/or other media previously determined by called party (12) from database (15) (H). Dynamic player (14) shows these choices to called party (12) via selection platform (16) (I and J). Said selection platform (16) obtains the selected tone, music, pictures, video, animated gif and/or other media from called party (12) (K) and sends said selection to dynamic player (14) (L). Dynamic player (14) sends said selection to calling party (11) (M). Dynamic player (14) monitors whether selection is played through to the end. If it is cut short then dynamic player (14) sends the content of the selection in an SMS or imessage or other media to calling party (11) (N). The same approach is equally applicable when the user communicates through a USSD application, SIM application, smart watch application, smart car application, other wearable devices applications or similar, in which case a respective application will perform the function of the selection platform (16).

The called party (12) is able to control the dynamic tone system (10) using a selection platform (16) such as a smartphone application so as to dynamically shape the busy tone or the ring back tone. As previously noted, the tone that will be played to caller party (11) can be shaped by combining existing parts, such as part 1: preset tone, part 2: dynamic tone or from scratch such as text to speech conversion. As noted above, the message content in the form of an audio record is either selected from a database of preset or user-selected entries or the user records an audio file to be transmitted by the dynamic tone service. Therefore, the system and method advantageously allows for transmission of data during call setup process.

Moreover, if the ring back tone or the busy tone containing the dynamically selected message as determined by the called party (12) cannot be fully presented to the caller, then a notification SMS or imessage or other media is received by the called terminal.

Tasks of dynamic player (14) according to dynamic tone system (10) when used for dynamic busy tone service can be summarized as follows:

Reading the telephone number from which the call is forwarded,

It communicates with database (15) to determine whether said telephone number belongs to a subscriber. If so, continues on to the following steps. If not, ends the call, It communicates with database (15) to obtain the preset busy tone of called party (12) and plays said tone to calling party (11), It communicates with database (15) to obtain a list of choices of tones, music, pictures, videos, animated gifs and/or other media previously determined by called party (12), It determines which selection platform (16) called party (12) uses, such as USSD applications, SIM applications, smartphone applications, smart watch applications, other wearable device applications, smart car applications or similar, It communicates with said selection platform (16), for example smartphone application to obtain real-time selection of called party (12) and plays or sends this selection to calling party (11), It changes tones with new selected tones while playing, where the change is made at specified transition points, It monitors whether called party's (12) selection was played through to the end. If not, sends the content of the selection in an SMS or imessage or similar to calling party (11), If called party's (12) selection has a visual component (such as a picture, video or animated gif), sends said visual component to calling party (11) as MMS or imessage or other media while called party's preset busy tone is played or after its completion.

Figure 3:
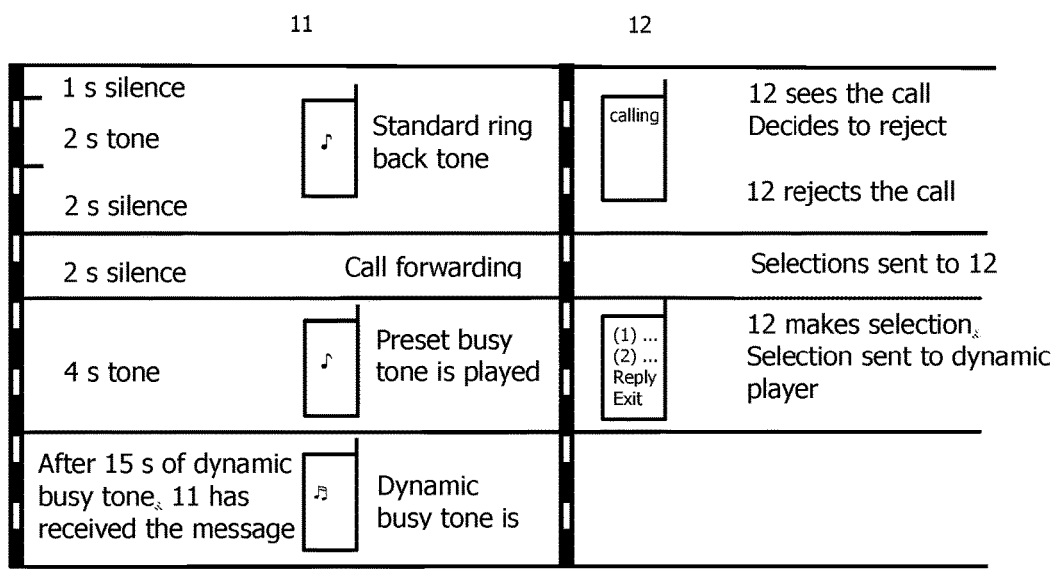
FIG. 3 demonstrates a timeline diagram of an embodiment of dynamic busy tone system, where maximum silence is 4 seconds, which is identical to standard ring back tone silence.

FIG. 3 illustrates an exemplary timeline diagram of the respective operations according to the present system and method, during which the calling party (11) hears no deviation from standard 4 seconds silence of standard ring back tone. Calling party (11) places a call to called party (12). Five seconds elapse for called party (12) to see the call and decide whether to accept or reject it. In the meantime, calling party (11) hears one second silence, then two seconds tone and two seconds silence as a part of standard ring back tone. At this point, called party (12) rejects the call. Call is forwarded to dynamic player (14) by telecom network (13) which lasts two seconds. Overall, calling party (11) hears one second of silence, followed by two seconds tone followed by four seconds silence which is identical to standard ring back tone audio. After that, called party (12) makes a real time selection of dynamic busy tone and this selection is sent to dynamic player (14) within a total of four seconds, during which dynamic player (14) plays preset busy tone to calling party (11). From this point, dynamic player (14) sends said dynamic busy tone to calling party (11). After dynamic busy tone has been played for fifteen seconds, calling party (11) has received the message completely.

Figure 4:
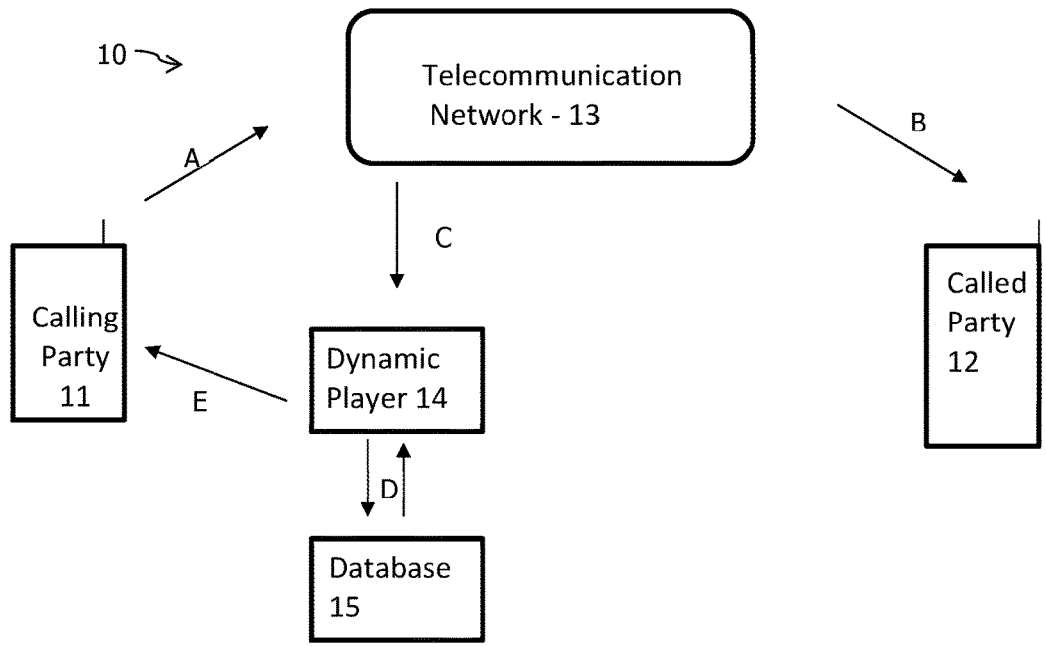
FIG. 4 demonstrates a block diagram of dynamic tone system, or more particularly dynamic busy and ring back tone system playing a preset ring back tone.

FIG. 4 illustrates an exemplary block diagram referred to as dynamic tone system (10) or more particularly dynamic busy and ring back tone system playing a preset ring back tone according to the present disclosure. Dynamic busy and ring back tone system (10) comprises calling party (11), called party (12), telecom network (13), dynamic player (14) and database (15). Calling party (11) places a call to called party (12) via telecom network (13) (A). Telecom network (13) sends a ringing signal to called party (12) (B). Telecom network (13) directs the call to dynamic player (14) through Intelligent Network abilities as an example (C). Dynamic player (14) obtains preset ring back tone of called party (12) from database (15) (D) and plays said preset ring back tone to the calling party (11) (E).

Tasks of dynamic player (14) according to dynamic tone system (10) when used for dynamic busy and ring back tone service to dynamically shape a ring back tone or busy tone can be summarized as follows:

Reading the telephone number from which the call is forwarded,

It communicates with database (15) to determine whether said telephone number belongs to a subscriber. If so, continues on to the following steps. If not, ends the call, It communicates with database (15) to obtain the preset ring back tone of called party (12) and plays said tone to calling party (11), It communicates with database (15) to obtain a list of choices of dynamic ring back tones and dynamic busy tones, music, pictures, videos, animated gifs and/or other media previously determined by called party (12), It determines which selection platform (16) called party (12) uses, such as USSD applications, SIM applications, smartphone applications, smart watch applications, other wearable device applications, smart car applications or similar, by communicating with database (15), It communicates with said selection platform (16), for example smartphone application (selection platform, 16) to obtain real-time selection of called party (12), If said real-time selection is a dynamic ring back tone, additionally shows the list of choices of dynamic ring back tones and dynamic busy tones previously determined by called party (12) to said called party (12), so that called party (12) can make a new selection if they so wish, If said real-time selection is a dynamic busy tone, sends the selection to calling party (11) and disconnects the connection to called party (12), Monitors whether called party's (12) selection was played through to the end. If not, sends the content of the selection in an SMS or imessage or other media to calling party (11), If called party's (12) selection has a visual component (such as a picture, video or animated gif), sends said visual component to calling party (11) as MMS or imessage or other media while called party's preset busy tone is played or after its completion.

Figure 5:
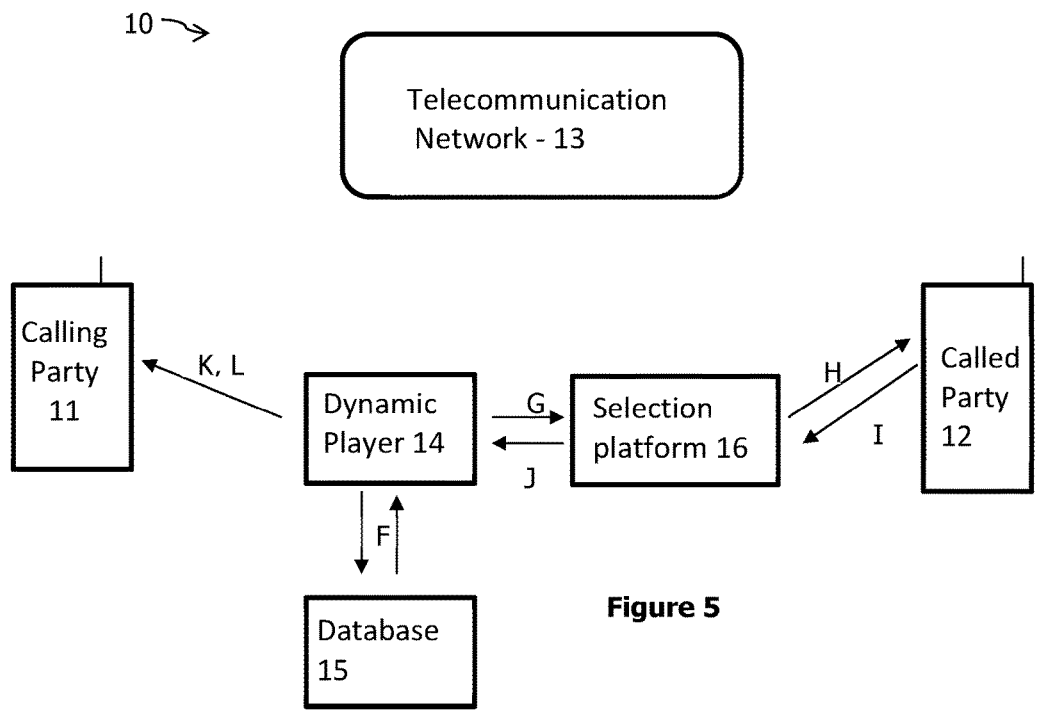
FIG. 5 demonstrates a block diagram of dynamic tone system, or more particularly dynamic busy and ring back tone system playing a dynamic ring back tone.

FIG. 5 illustrates a variation example referred to as dynamic tone system (10) or more particularly dynamic busy and ring back tone system playing a dynamic ring back tone. The system comprises calling party (11), called party (12), mobile network (13), dynamic player (14), database (15) and selection platform (16) such as the smartphone application. Dynamic player (14) according to the dynamic tone system (10), when used for dynamic busy and ring back tone system (10), obtains a list of choices of ring back tones and busy tones (12) from database (15) (F). Dynamic player (14) shows these choices to called party (12) via selection platform (16) (G and H). Selection platform (16) obtains the selection from the called party (12) (I) and sends said selection to dynamic player (14) (J). Dynamic player (14) sends said selection to calling party (11) (K). Dynamic player (14) monitors whether selection is played through to the end. If it is cut short then dynamic player (14) sends the content of the selection in an SMS or imessage or similar to calling party (11) (L). The same approach is equally applicable when the user communicates through other interfaces such as a USSD application or smartwatch application or other, in which case a respective application will perform the function of the smartphone application (selection platform, 16).

In dynamic tone system, the task of the selection platform (16) is to obtain a list of choices of tones, music, pictures, videos, animated gifs and/or other media previously determined by called party (12), show these choices on the screen of called party's (12) telecommunication device, receive the real-time shaping input of called party (12), which can be a selection or complete input from scratch such as text and send said selection to dynamic player (14). Smartphone application (16) can be used as a selection platform (16). However, selection platform (16) is not limited to smartphone applications and additionally comprises USSD applications, SIM applications, smart watch applications, other wearable device applications, smart car applications and similar. Applications for smartphones, smart watches, other wearable devices, smart cars and similar can contain push notification alerts, more specifically to enable dynamic tone system (10) to present choices to subscriber and receive the selection during call setup, especially while the phone is ringing.

In dynamic tone system (10), the task of the database (15) is to store phone number of subscribing called party (12), preset and dynamic ring back and busy tones, durations of said tones, text messages to be sent to the calling party (11) if tones are not played to the end, as well as music, picture, video, animated gif and other media that can be sent to the calling party (11) by dynamic tone service and subscriber selections thereof. Operator network (13) has access to database (15). Subscribing called party (12) has access to database (15) except for their phone number. Database (15) may contain a preset subset of selections for each calling party (11) as well as for certain dates and specific times of day.

Output provided to a caller can be made available for the caller to copy, such that the caller can buy or assign the content to him/herself. Additionally, a subscriber of the system can select an output (e.g., an audio clip, etc.) and sent it to another entity. Likewise, in addition to being able to copy the output (e.g., an audio clip), or send it, a user can also add the output to the user's library, such as a personal photo album, a personal music library, or the like.

In a nutshell, the present disclosure (among other things) proposes a method for providing a telecommunication service conveying data from a called party (12) telecommunication device to a calling party (11) telecommunication device during a call setup procedure comprising the steps of; a) said calling party (11) telecommunication device placing a call to said called party's (12) telecommunication device, b) forwarding the call to a dynamic player (14) by the operator network (13) within call setup procedure, c) presenting dynamic tone selection options to called party (12) and receiving the selection in the manner that the called party telecommunication device presents and inputs data during call setup, d) presenting dynamic tone selection of the called party (12) to the calling party (11) in the manner that within call setup, a real time shaped or determined dynamic tone is played to said calling party (11).

In a further embodiment, said dynamic tone selection options include dynamic ring back tone or dynamic busy tone selection options.

In a further embodiment, the called party telecommunication device presents and inputs data during call setup through forward when busy function in the case of dynamic busy tone selection options and smartphone application abilities which enable output presentation and input enabling on the ringing device in the case of dynamic ring back tone selection options.

In a further embodiment, the call forwarding is made through call forwarding service or by Intelligent Network solutions of the telecommunication network (13).

In a further embodiment, the method further comprises the step of forwarding the call to said dynamic player (14) by the operator network (13) within call setup procedure if the called party (12) rejects the call or if the line is busy.

In a further embodiment, the method further comprises the step of presenting dynamic tone selection of the called party (12) to the calling party (11) in the manner that a real time shaped or determined dynamic tone is played to said calling party (11).

In a further embodiment, when called party (12) rejects the call, the connection to the called party (12) is disconnected and the call is listed under missed or rejected call list, while connection to the calling party (11) is intact, such that option presentation on and input from the called device (12) is enabled during call setup.

In a further embodiment, when called party's (12) telecommunication device is ringing, the option presentation on and input from called party's (12) ringing device is made in the form of push notification alerts.

In a further embodiment, dynamic ring back tone or dynamic busy tone selection of the called party (12) is played until the maximum duration defined by the telecommunication network (13) or the calling party (11) hangs up.

In a further embodiment, dynamic tone selection options are displayed to the called party (12) when triggered by said dynamic player (14).

In a further embodiment, said dynamic player (14) communicates with said called party's (12) telecommunication device through a selection platform (16).

In a further embodiment, said selection platform (16) is a USSD application, SIM application, smartphone application, smart watch application, wearable device application or smart car application.

In a further embodiment, said dynamic tone selection options additionally include selection of music, picture, animated gifs or video files to be sent to the calling party (11) as call setup is taking place or after its completion.

In a further embodiment, music, image, animated gifs or video files are sent to the calling party (11) in the form of MMS, imessage or other media.

In a further embodiment, said method comprises the step of monitoring whether the dynamic tone is fully played to the calling party (11) and if not comprises the step of sending text message or other media consisting of the content of the dynamic tone to the calling party (11).

In a further embodiment, said method comprises the step of monitoring whether the music, picture, animated gif or video was fully transferred to the calling party (11) and if not comprises the step of sending an informational notification to the calling party (11).

In a further embodiment, said dynamic tone selection options include real time recording of called party's (12) audio or video input during call setup procedure, to be conveyed to caller party (11).

In a further embodiment, said audio or video input is processed to be converted into songs, pictures, videos or other media.

In a further embodiment, said dynamic tone selection options include real time text inputting by the called party (12) and the method further comprises the step of converting said user-inputted text into an audio or video record to be sent to the calling party (11) during call setup procedure.

In a further embodiment, said dynamic tones are changed with new selections while playing, where the change is made at specified transition points.

The invention claimed is:

1. A method for providing a telecommunication service conveying data from a called party telecommunication device to a calling party telecommunication device during a call setup procedure comprising the steps of:
   said calling party telecommunication device placing a call to said called party telecommunication device over an operator network to create a connection therebetween,
   receiving a rejection of the call from the called party telecommunication device and disconnecting the connection to the called party telecommunication device while keeping the connection to the calling party telecommunication device intact, wherein disconnecting the connection ends limited use of the called party telecommunication device experienced while the called party telecommunication device is ringing,
   forwarding the call to a dynamic player by the operator network within the call setup procedure,
   triggering the dynamic player, after the connection to the called party telecommunication device is disconnected and in response to receipt of the rejection, to communicate dynamic tone selection options to the called party and receiving a selection in a manner that the called party telecommunication device presents and inputs data during the call setup procedure after the connection to the called party telecommunication device is disconnected and the call is listed on a missed or rejected call list of the called party telecommunication device,
   presenting, by the dynamic player a dynamic tone selection of the called party to the calling party in a manner that, within the call setup procedure, a real time determined dynamic tone is played to said calling party by said dynamic player via said calling party telecommunication device, where the dynamic tone selection options include dynamic busy tone selection options.

2. The method for providing a telecommunication service as set forth in claim 1 wherein the call forwarding is made through call forwarding service or by Intelligent Network solutions of the telecommunication network.

3. The method for providing a telecommunication service as set forth in claim 1, further comprising the step of forwarding the call to said dynamic player by the operator network within the call setup procedure if the called party rejects the call or if the line is busy.

4. The method for providing a telecommunication service as set forth in claim 3, further comprising the step of presenting dynamic tone selection of the called party to the calling party in a manner that a real time determined dynamic tone is played to said calling party.

5. The method for providing a telecommunication service as set forth in claim 1 wherein dynamic busy tone selection of the called party is played until a maximum duration defined by the operator network, or the calling party hangs up.

6. The method for providing a telecommunication service as set forth in claim 1 wherein dynamic tone selection options are displayed to the called party by a selection platform when triggered by said dynamic player.

7. The method for providing a telecommunication service as set forth in claim 1, wherein said dynamic player communicates with said called party telecommunication device through a selection platform.

8. The method for providing a telecommunication service as set forth in claim 7 wherein said selection platform is a unstructured supplementary service data (USSD) application, subscriber identify module (SIM) application, smartphone application, smart watch application, wearable device application or smart car application.

9. The method for providing a telecommunication service as set forth in claim 1 wherein said dynamic tone selection options additionally include selection of music, picture, animated gifs or video files to be sent to the calling party as the call setup procedure is taking place or after its completion.

10. The method for providing a telecommunication service as set forth in claim 9 wherein music, image, animated gifs or video files are sent to the calling party in the form of multimedia messaging service (MMS), imessage or other media.

11. The method for providing a telecommunication service as set forth in claim 1 further comprising the step of monitoring whether the dynamic tone is fully played to the calling party and if not, the method further comprises the step of sending a text message or other media consisting of the content of the dynamic tone to the calling party.

12. The method for providing a telecommunication service as set forth in claim 9 further comprising the step of monitoring whether the music, picture, animated gif or video was fully transferred to the calling party and if not the method further comprises the step of sending an informational notification to the calling party.

13. The method for providing a telecommunication service as set forth in claim 1 wherein said dynamic tone selection options include real time recording of called party's audio or video input during call setup procedure, to be conveyed to caller party.

14. The method for providing a telecommunication service as set forth in claim 13 wherein said audio or video input is processed to be converted into songs, pictures, videos or other media.

15. The method for providing a telecommunication service as set forth in claim 1 wherein said dynamic tone selection options include real time text inputting by the called party and the method further comprises the step of converting said user-inputted text into an audio or video record to be sent to the calling party during the call setup procedure.

16. The method for providing a telecommunication service as set forth in claim 1 wherein tones represented by the dynamic tone selection options are changed with new selections while playing, where the change is made at specified transition points.

17. The method for providing a telecommunication service as set forth in claim 1, wherein receiving a rejection of the call from the called party telecommunication device and disconnecting the connection to the called party telecommunication device comprises presenting, by the dynamic player a preset busy tone to the calling party in a manner that, within the call setup procedure, the preset busy tone is played to said calling party by said dynamic player via said calling party telecommunication device.

* * * * *